United States Patent [19]

Anfilov et al.

[11] 4,226,514

[45] Oct. 7, 1980

[54] ELECTROGRAPHIC PHOTOCOMPOSING MACHINE

[76] Inventors: Igor V. Anfilov, ulitsa Udaltsova, 12, kv. 136, Moscow; Jury V. Abramov, ulitsa Petra Alexeeva, 113, Tula; Geny S. Ershov, prospekt Energetikov, 46, korpus 1, kv. 72, Leningrad; Valentin G. Bogomolov, ulitsa Malaya Andronievskaya, 7/17, kv. 1, Moscow; Eduard A. Kaidoshko, prospekt Lunacharskogo, 68, korpus 2, kv. 82, Leningrad; Jury B. Remizov, ulitsa Zelenogradskaya, 21, korpus 2, kv. 193; Anatoly L. Rozhenko, ulitsa Lavochkina, 6, korpus 2, kv. 215, both of Moscow; Gennady P. Suvorov, prospekt K. Marxa, 70, kv. 81, Leningrad, all of U.S.S.R.

[21] Appl. No.: 72,555

[22] Filed: Sep. 4, 1979

[51] Int. Cl.[3] .................... G03B 15/00; G03B 17/06; G03G 15/00

[52] U.S. Cl. .................... 354/7; 354/15; 355/3 FU

[58] Field of Search .................... 354/7, 14, 15; 355/3 FU

[56] References Cited

U.S. PATENT DOCUMENTS

| | | | |
|---|---|---|---|
| 3,053,962 | 9/1962 | Cerasani et al. | 355/3 FU |
| 3,537,365 | 11/1970 | Schumann | 354/15 |
| 3,631,774 | 1/1972 | Tidd | 354/15 |
| 3,670,633 | 6/1972 | Mason et al. | 354/15 X |
| 3,678,820 | 7/1972 | Chen et al. | 354/15 |
| 3,685,406 | 8/1972 | Chen | 354/15 X |
| 3,693,517 | 9/1972 | Clark | 354/15 X |
| 3,750,539 | 8/1973 | Mason | 354/15 X |
| 3,759,149 | 9/1973 | Mason | 354/15 |
| 3,768,384 | 10/1973 | Mason | 354/15 |
| 3,881,085 | 4/1975 | Traister | 355/3 FU |

OTHER PUBLICATIONS

Graphic Arts Monthly, May 1979, vol. 51, No. 5, pp. 168 l, 168 p, 168 r.

*Primary Examiner*—Donald A. Griffin
*Attorney, Agent, or Firm*—Fleit & Jacobson

[57] ABSTRACT

An electrographic photocomposing machine comprises a rotary type carrier provided with a flashtube having a control unit, a photographic unit, and a line forming mechanism, the latter two being arranged in series downstream of the type carrier along the beam from the flashtube. The line forming mechanism is provided with a drive made as a start-stop mechanism comprising a series arrangement including an electric pulse generator, a switch and a step motor. The machine also comprises an electrophotographic section including a cylindrical intermediate image carrier having a drive similar to that of the line forming mechanism and being optically associated with the latter, a device for transferring the powder image with a paper feed system, and a unit for fixing the powder image on the paper with heaters arranged in proximity to the paper web. The unit for fixing the powder image on the paper has a self contained means for contact heating of the paper web, a means for air cooling of the powder image, and a unit for pulsed actuation of the heaters, the latter unit being essentially a series arrangement including a cyclic pulse counter of the intermediate image carrier drive and a switch. One of the outputs of the unit for pulsed actuation of the heaters is connected to the latter, while the other output is connected to the means for air cooling of the powder image. In addition, the machine comprises a computer unit coupled to the control input of the switch of the drive of the line forming mechanism, to the control unit of the flashtube, and to the control unit of the switch of the drive of the intermediate image carrier.

4 Claims, 5 Drawing Figures

ELECTROGRAPHIC PHOTOCOMPOSING MACHINE

FIELD OF THE INVENTION

The present invention relates to electrographic engineering, and more particularly to electrographic photocomposing machines.

The invention can most advantageously be used in computer centers for printing computer output data. In addition, it can find application in printing houses for making small offset plates or producing proofs in textual information processing systems using photocomposition.

BACKGROUND OF THE INVENTION

At present, computer output data are printed out with the aid of alphanumeric printers using the same character face and size. Such a simplified printout of textual information does not always satisfy the requirements of information services in rapid printing of such matter as reference books, catalogues, promotional booklets and other documents which are normally printed with different type faces and sizes. To meet this requirement, the initial information printed on alphanumeric printers must be reprinted by conventional printing means, which takes much more time.

In conventional printing, when text data processing systems being photocomposition are employed, the initial punched tape has to be printed out for editorial revision and proof reading. The use for this purpose of alphanumeric printers with simplified characters does not fully solve the problem because of the limited type face which does not tell much about the typography of the future publication. Nor is the use of automatic photocomposing machines always possible for the purpose because of the prohibitively high cost of the photographic materials on which the image is produced.

Known in the art is an electrographic photocomposing machine (cf. U.S. Pat. No. 3,768,384; Cl. 95-4,5; 1973) comprising a rotary type carrier provided with a flashtube and a control unit, a photographic unit and a driven line forming mechanism, the latter two being arranged in series downstream of the type carrier along the beam produced by the flashtube. The photocomposing machine also comprises an electrophotographic section including a cylindrical intermediate image carrier optically associated with the line forming mechanism and provided with its own drive, a charging device arranged in direct proximity to the intermediate image carrier in the latent image forming zone and provided with a lamp for exposure of the intermediate image carrier, and a device for developing the latent image, contiguous with the surface of the intermediate image carrier and oriented in the direction of its rotation, downstream of the charging device. The electrophotographic section also includes a device for transferring the powder image, provided with a driven paper feed system, ensuring mechanical contact between the paper web and the intermediate image carrier, and arranged downstream of the latent image developing device in the direction of rotation of the intermediate image carrier. In addition, the electrophotographic section comprises a unit for fixing the powder image onto the paper with heaters arranged near the paper web on the side of the powder image and downstream of the powder image transferring device in the direction of paper motion, and a device for cleaning the intermediate image carrier, located downstream of the powder image transferring means in the direction of rotation of the intermediate image carrier. The machine also comprises a computer electrically associated with the drive of the line forming mechanism and coupled to the control unit of the flashtube.

In this prior art photocomposing machine, the drives of the line forming mechanism, cylindrical intermediate image carrier and paper feed system are electric motors with a constant rotational speed.

In such a machine, the text is formed character by character on the surface of the regularly rotating intermediate image carrier, following instructions initiated by the computer unit, from the disk type carrier with the aid of the flashtube, photographic unit and line forming mechanism.

The photographic unit is essentially a chain transporter with optical carriages each made up of a lens and a mirror. The transporter moves at an angle to the generatrix of the cylindrical intermediate image carrier, determined by the ratio of the carriage speed to that of the intermediate image carrier.

Obviously, since regularly rotating type carrier, intermediate image carrier and transporter with carriages are used in the machine, the actual spacings between characters (approaches) will differ from the design values because of the fact that, after a carriage has moved an amount of space corresponding to a given position of the character in the text line, additional (uncontrollable) time is required for the character selected on the type carrier to approach the exposure zone, during which the carriage and intermediate image carrier continue to move.

Also, in the prior art electrographic photocomposing machine, the presence of the above regularly rotating components makes it necessary to keep the heaters of the unit for fixing the powder image onto the paper constantly on, which does not provide for the desired quality of the electrographic prints. When tubular heaters are used, heat is transferred from the latter to the prints through air, which leads to heating both the powder image and paper to high image fixing temperatures with the result that the paper may warp and its mechanical properties may be impaired. When high-temperature heaters are used, heat is transferred by way of radiation, which may lead to the image burning through the paper, i.e. characters may appear on the back side of the paper. This results from the fact that, unlike the powder, the paper reflects, during fixing of the powder image, most of the infrared radiation and has no time to be heated. The burn-through occurs as a result of heat being transferred from the heated powder to the paper portions corresponding in shape to respective characters.

It should also be noted that the prior art machine makes it difficult to compose complex texts and sizes since this requires time and can only be provided by stopping the intermediate image carrier, paper feed system and chain transporter with carriages. Frequent stops of these components involve, first of all, considerable forces of inertia to be defeated in the mechanisms of their drives and, secondly, fail to provide for even fixing of the powder image on the paper in the respective unit with the heaters being constantly on because of the different times of their thermal action of the powder image.

Thus, the design of the unit for fixing the powder image on paper with the heaters being constantly on and the impossibility of composing characters of different faces and sizes in the prior art electrographic photocomposing machine do not provide for a sufficiently high quality of electrographic prints.

SUMMARY OF THE INVENTION

It is therefore an object of the present invention to improve the quality of electrographic prints.

Another object of the invention is to enable composition of types of different faces and sizes.

These objects are attained by that, in an electrographic photocomposing machine comprising a rotary type carrier provided with a flashtube having a control unit, a photographic unit and a driven line forming mechanism, the latter two being arranged in series downstream of the type carrier along the beam from the flashtube, an electrophotographic section including a cylindrical intermediate image carrier optically associated with the line forming mechanism and having a drive of its own, a charging device arranged in direct proximity to the intermediate image carrier in the latent image forming zone and provided with a lamp for exposure of the intermediate image carrier, a device for developing the latent image, contiguous with the surface of the intermediate image carrier and arranged in the direction of its rotation downstream of the charging device, a device for transferring the powder image with a paper feed system having a drive, which ensures mechanical contact between the paper web and the intermediate image carrier and is arranged downstream of the device for developing the latent image in the direction of rotation of the intermediate image carrier, a unit for fixing the powder image on the paper with heaters arranged in proximity to the paper web, on the side of the powder image, downstream of the device for transferring the powder image in the direction of paper motion, a device for cleaning the intermediate image carrier, arranged downstream of the device for transferring the powder image in the direction of rotation of the intermediate image carrier, and a computer unit electrically associated with the drive of the line forming mechanism and coupled to the control unit of the flashtube, according to the invention, the unit for fixing the powder image on the paper has a self-contained means for contact heating of the paper web, arranged on the side of the paper web opposite to the powder impage and the heaters, a means for air cooling of the powder image, arranged opposite the heaters, level with the paper web, and a unit for pulsed actuation of the heaters, which is essentially a series arrangement including a cyclic counter of pulses of the drive of the intermediate image carrier and a switch, one of the outputs of the unit for pulsed actuation of the heaters being connected to the latter, the other output being connected to the means for air cooling of the powder image, the drives of the cylindrical image carrier and the line forming mechanism being in the form of start-stop mechanism each comprising a series arrangement including an electric pulse generator, a switch and a step motor, the control inputs of the switches of the drives of the line forming mechanism and intermediate image carrier being connected to the computer unit, and the output of the switch of the drive of the intermediate image carrier being connected to the input of the cyclic pulse counter, which serves as the input of the unit for pulsed actuation of the heaters.

The rotary type carrier should preferably be provided with a type face changing mechanism with a drive electrically associated, via the computer unit, with the control input of the switch of the drive of the line forming mechanism.

The photographic unit should preferably be provided with a type size changing mechanism with a drive, electrically associated, via the computer unit, with the control input of the switch of the drive of the line forming mechanism.

It is advisable that the switch of the unit for pulsed actuation of the heaters comprise a timer having an input which serves as the input of the switch and is connected to the output of the cyclic pulse counter, and an output which serves as an output of the switch, a thyristor whose cathode is connected in series with the heaters and serves as another output of the switch and whose control gate is connected to the other output of the timer, a transistor whose collector is connected to the other output of the timer and to the control gate of the thyristor and whose emitter is connected to the neutral wire of the heaters, a voltage divider including two resistors connected in series between the anode of the thyristor and the neutral wire of the heaters, the mid-point of the voltage divider being connected to the base of the transistor, and a full-wave rectifier having one of its outputs connected to the neutral wire of the heaters and the other output coupled to the anode of the thyristor.

The proposed electrographic photocomposing machine enables composition of both simple and complex texts at a speed of up to 60 characters per second, ensures even fixing of the powder image on the paper web without any image burnthroughs no matter how irregularly the paper moves, and eliminates the effect of RF noise.

The currently existing techniques for text data processing using photocomposition permit application of the proposed machine at the stage of editorial revision and proof reading of the punched tape coming from automatic photocomposing machines. The proofs produced on the proposed machine are inexpensive and convenient for production of a publication layout. The machine also permits extending the possibilities of computers in printing out complex alphanumeric information. Thus, the proposed machine can be used in most photocomposing equipment systems as well as a computer output device.

BRIEF DESCRIPTION OF THE DRAWINGS

The invention will now be described in greater detail with reference to specific embodiments thereof, taken in conjunction with the accompanying drawings, wherein.

DETAILED DESCRIPTION OF THE INVENTION

Figure 1:
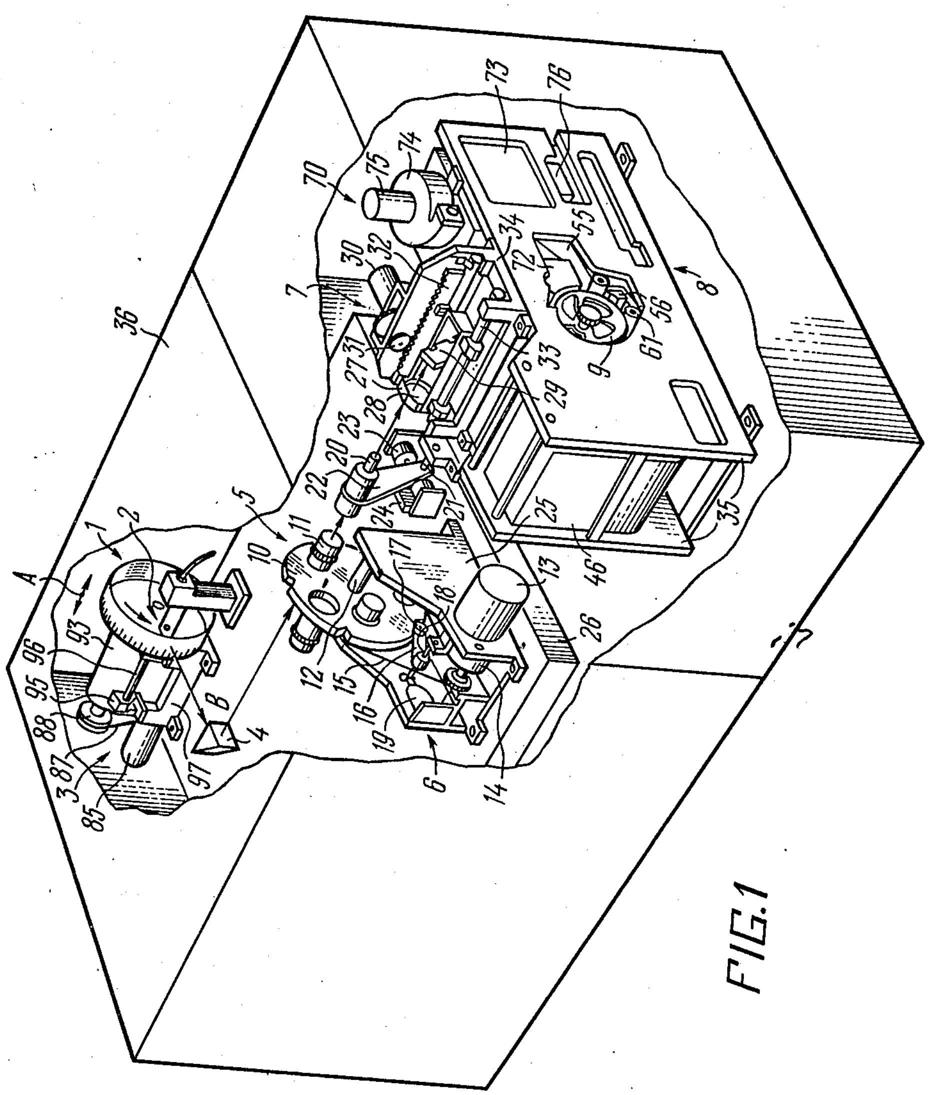
FIG. 1 is a general axonometric view of an electrographic photocomposing machine, according to the invention.

Referring now to FIG. 1, the electrographic photocomposing machine comprises a rotary type carrier 1 with a type face changing mechanism, provided with a flashtube 2 having a control unit, and a drive 3. Arrow A in the drawing shows the direction of axial movement of the type carrier 1. Arranged in series along the beam (indicated by arrows B) from the flashtube 2 are a prism 4 which deflects the beam path, a photographic unit 5 with a type size changing mechanism 6 provided with a drive, a line forming mechanism 7 with a drive, and an electrophotographic section 8.

The electrophotographic section 8 incorporates a cylindrical intermediate image carrier 9 having a drive of its own and being optically associated with the line forming mechanism 7.

The photographic unit 5 with the type size changing mechanism 6 is made as a turret 10 with five interchangeable lenses 11 (shown here in the working position). The turret 10 is mounted on a horizontal shaft 12 and rotated by an electric motor 13 via a reduction gear 14 and a belt drive 15. The lenses 11 are fixed in the working position by an arm 16 with a roller 17 which falls into recesses made on the turret 10 and equal in number to the lenses 11. The arm 16 is mounted on a shaft 18 and is actuated by an electromagnet 19.

The photographic unit 5 also includes a Galilean tube 20 mounted on an arm 22 rocking in relation to a shaft 21, the arm 22 being actuated by electromagnets 23. The shaft 21 and solenoids 23 are housed in a case 24.

The photographic unit 5 with the type size changing mechanism 6 (with the exception of the Galilean tube 20) are enclosed in a housing 25. The type carrier 1 with the type face changing mechanism, the photographic unit 5 with the type size changing mechanism 6 and the casing 24 are secured on a horizontal plate 26.

The line forming mechanism 7 comprises a carriage 27 mounted whereon are a lens 28 and a mirror 29 deflecting the light beam from the photographic unit 5 in a direction normal to the surface of the intermediate image carrier 9. The carriage 27 is moved along the generatrix of the intermediate image carrier 9 by a step motor 30 through a pinion 31 and a rack 32 made integral with the carriage 27.

The carriage 27 moves on a guide 33 secured on supports 34 which are attached to walls 35 of the electrophotographic section 8.

The type carrier 1 with the type face changing mechanism, the photographic unit 5 with the type size changing mechanism, the casing 24 of the Galilean tube 20 and the electrophotographic section 8 are accommodated in a lightproof housing 36.

The photographic unit 5 and the line forming mechanism 7 may have other embodiments, e.g. in the form of a stationary lens adjustable, according to the type size, along the optical axis of the photographic unit 5, and two line forming prisms mounted on carriages.

The electrophotographic section 8 (FIG. 2) comprises the cylindrical intermediate image carrier 9 having its surface coated with a photoconductive layer of, for example, amorphous selenium. The intermediate image carrier 9 is mounted on a shaft 37 rotated by a step motor 38 via a worm 39 and a worm gear 40. The shaft 37 is fitted in bearings 41.

The electrophotographic section 8 also comprises a Scorotron-type charging device with coronizing wires and a grid (not shown) connected to a dc source, the charging device 42 being arranged in direct proximity to the intermediate image carrier 9 in the latent image forming zone and provided with a lamp 43 for exposure of the intermediate image carrier 9, located in a lightproof housing 44 (conventionally shown transparent). The electrophotographic section 8 further comprises a device 45 for development of the latent image, contiguous to the surface of the intermediate image carrier 9 and oriented in the direction of its rotation (indicated by arrow C), downstream of the charging device 42.

A housing 46 (conventionally shown transparent) of the latent image developing device 45 accommodates a bucket elevator 47 actuated by an electric motor 48 via a worm 49, a worm gear 50 and a shaft 51, mounted on bearings 52. A toner dispenser (not shown) is also accomodated in the housing 46.

The electrophotographic section 8 also includes a device 53 for transferring the powder image, provided with a paper feed system 54 having a drive (not shown), ensuring mechanical contact between a paper web 55 and the intermediate image carrier 9, and arranged downstream of the latent image developing device 45 in the direction of rotation of the intermediate image carrier 9. The powder image transferring device 53 contains a Scorotron-type charging device 56 (similar to the charging device 42), a roll 57 of the paper web 55, mounted on a shaft 58 fitted in bearings 59, carrier rollers 60, guide rollers 61, and discharge rollers 62. The powder image transferring device 53 also includes a tension roller 63 forced by its own weight against the paper web 55 and adapted to revolve in arms 64 rocking freely with respect to a pin 65 fitted in bearings 66.

Also provided in the electrophotographic section 8 is a unit 67 for fixing the powder image on the paper, with heaters 68 arranged near the paper web 55, on the side of the powder image, downstream of the powder image transferring device 53 in the direction of motion of the paper web 55 (indicated by arrow D). The unit 67 for fusing the powder image into the paper is provided with a self-contained means 69 for contact heating of the paper web 55, arranged on the side of the paper web 55 opposite to the powder image and the heaters 68.

The electrophotographic section 8 additionally comprises a device 70 for cleaning the intermediate image carrier 9, arranged in the direction of its rotation downstream of the powder image transferring device 53 and made up of a fur covered roller 71 accomodated in a housing 72 (conventionally shown transparent) and associated through a filter 73 with a fan 74 actuated by an electric motor 75.

Figure 3:
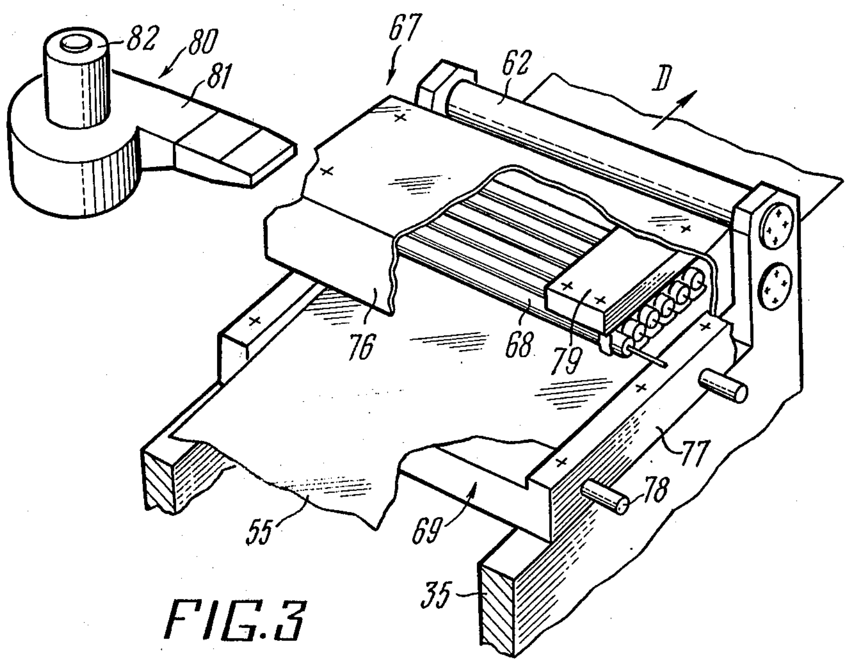
FIG. 3 is an axonometric view of the unit for fixing the powder image on the paper, according to the invention.

The unit 67 (FIG. 3) for fixing the powder image on the paper comprises the heaters 68 arranged in parallel and made, in the embodiment under consideration, as iodine-cycle incandescent lamps. The heaters 68 are placed in a reflector 76 above the paper web 55. The self-contained contact heating means 69 is in the form of a massive plate 77 with a tubular heater 78 and a temperature control device (not shown). The heaters 68 are mounted on brackets 79. The unit 67 also contains a means 80 for air cooling of the powder image, located opposite the heaters 68, level with the paper web 55, and including a centrifugal fan 81 actuated by an electric motor 82. The unit 67 (except for the air cooling means 80) is secured on the walls 35 of the electrophotographic section 8 upstream of the discharge rollers 62 in the direction of motion of the paper web 55.

Figure 4:
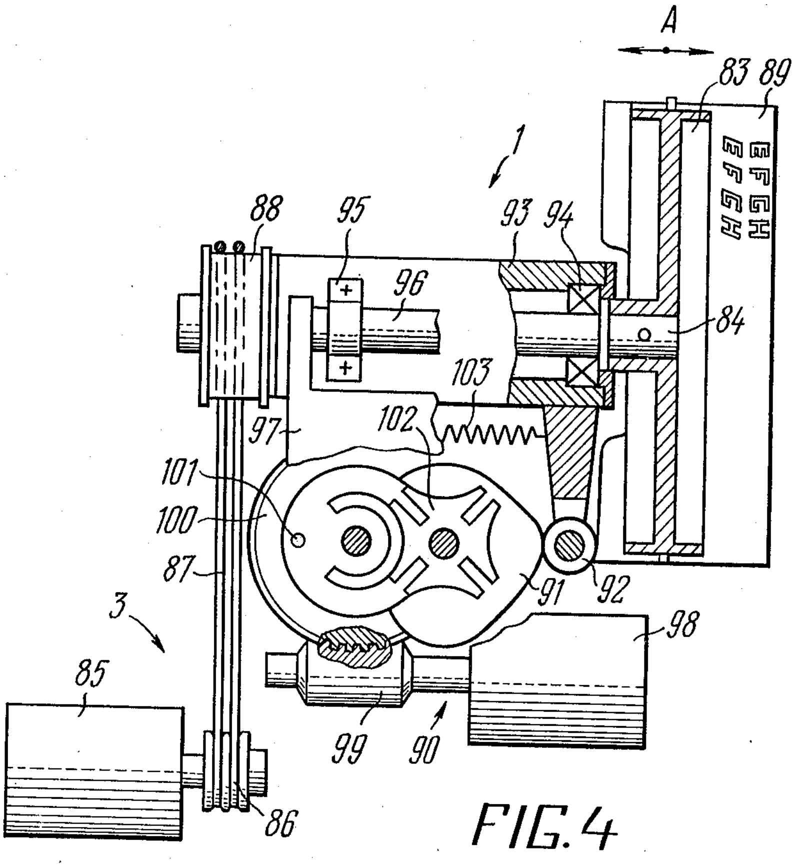
FIG. 4 is a longitudinal-section view of the type carrier with the type face changing mechanism, according to the invention.

The type carrier 1 (FIG. 4) is essentially a drum 83 rigidly fitted on a shaft 84. The drive 3 of the type carrier 1 is made as an electric motor 85 rotating the shaft 84 through a pulley 86, a belt 87 and a pulley 88 secured on the shaft 84. The surface of the drum 83 carries a film 89 with transparent characters (characters E, F, G, H are shown) arranged in several rows against a dark background. Each row contains characters of the same type face.

The type carrier 1 has a type face changing mechanism 90 which, in this embodiment, is essentially a mechanism providing for axial movement of the drum 83 and introducing the row of the required type face characters with the optical axis of the photographic unit 5 (FIG. 1). The type face changing mechanism 90 comprises a positioning cam 91 which shifts the shaft 84 with the drum 83 and the film 89 in the directions indicated by arrow A. The type face changing mechanism 90 also comprises a roller 92 rigidly associated with the shaft 84 through a sleeve 93 and ball bearings 94. Through sliding bearings 95 the sleeve 93 moves along a shaft 96 accommodated in a casing 97. The cam 91 of the type face changing mechanism 90 is driven by an electric motor 98 via a worm 99, a worm gear 100, and a Maltese cross mechanism made up of a yoke 101 and a Maltese cross 102. A spring 103 provides for positive engagement between the cam 91 and the roller 92. The type face changing mechanism 90 is also accommodated in the casing 97.

Figure 5:
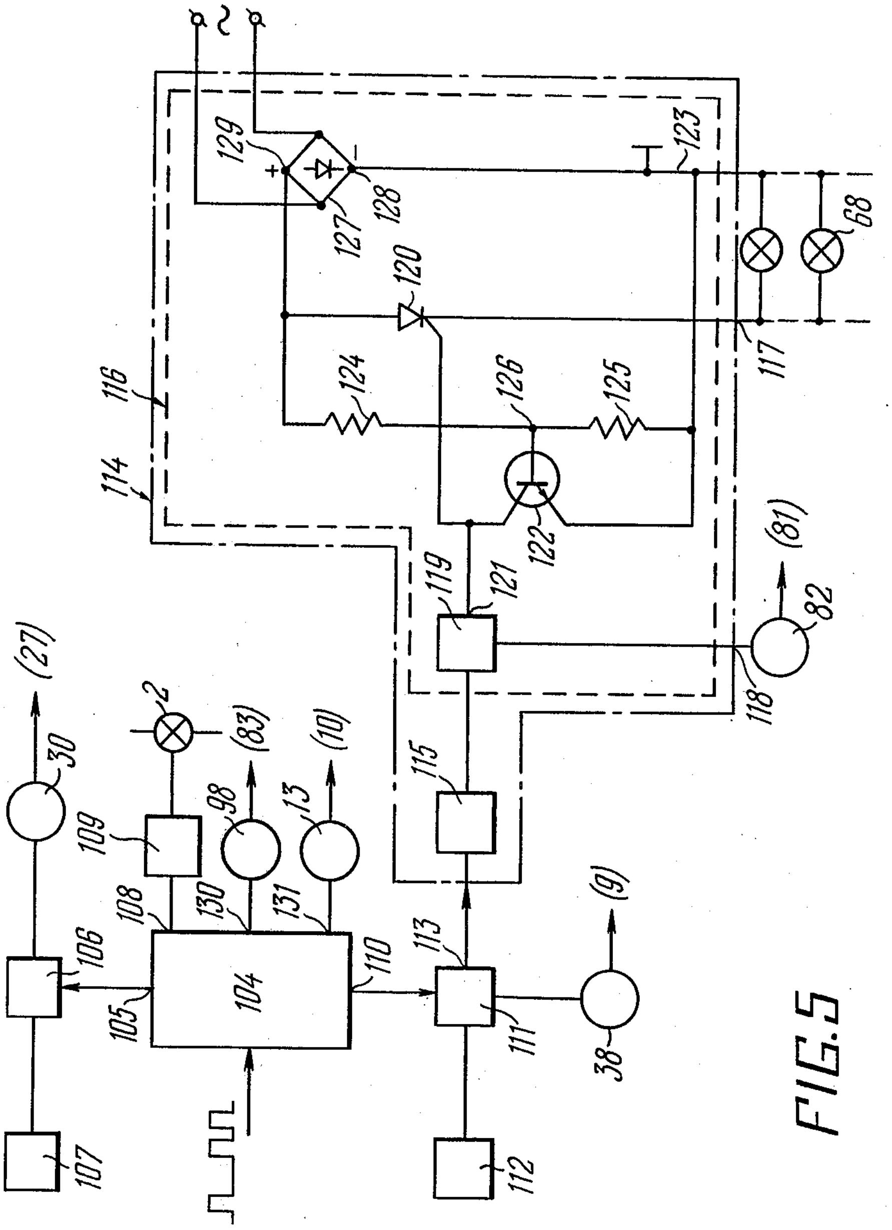
FIG. 5 is a block diagram of the control circuitry of the electrographic photocomposing machine shown in FIG. 1, according to the invention.

A block diagram of the control circuitry of the proposed electrographic photocomposing machine is represented in FIG. 5. The input of a computer unit 104 is driven by a data input unit (not shown). Connected to an output 105 of the computer unit 104 is the control input of a switch 106 of the drive of the line mechanism 7. The drive is essentially a start-stop mechanism with a series arrangement including an electric pulse generator 107, the switch 106, and the step motor 30 actuating the carriage 27. An output 108 of the computer unit 104 is connected to a control unit 109 of the flashtube 2. An output 110 of the computer unit 104 is connected to the control input of a switch 111 of the drive of the intermediate impage carrier 9, which is also a start-stop mechanism with a series arrangement including an electric pulse generator 112, the switch 111, and the step motor 38 actuating the cylindrical intermediate image carrier 9.

An output 113 of the switch 111 is connected to the input of a unit 114 for pulsed actuation of the heaters 68, comprising a series circuit including a cyclic counter 115 of pulses of the drive of the intermediate image carrier 9 and a switch 116 having one input 117 connected to the heaters 68 and another input 118 connected to the motor 82 of the fan 81 of the powder image air cooling means 80.

The switch 116 comprises a timer 119 whose input serves as the input of the switch 116 and is coupled to the output of the cyclic pulse counter 115 and whose one output serves as an output 118 of the switch 116, and a thyristor 120 whose cathode is connected in series with the heaters 68 and serves as another output 118 of the switch 116, while the control gate is connected to another output 121 of the timer 119. The switch 116 also comprises a transistor 122 whose collector is connected to the output 121 of the timer 119 and whose emitter is connected to a neutral wire 123 of the heaters 68, and a voltage divider with two series-connected resistors 124 and 125. The resistors 124 and 125 are connected in series between the anode of the thyristor 120 and the neutral wire 123 of the heaters 68, while the mid-point 126 between the resistors 124 and 125 is connected to the base of the transistor 122. In addition, the switch 116 comprises a full-wave rectifier 126 whose inputs are connected to a one-phase ac source (not shown), one output 128 is connected to the neutral wire 123 of the heaters 68, and another output 129 is connected to the anode of the thyristor 120.

An output 130 of the computer unit 104 is coupled to the motor 98 (FIG. 4) of the drive of the type face changing mechanism 90, which shifts the drum 83 of the type carrier 1 toward the shaft 96. The motor 98 is electrically associated, via the computer unit 104, with the control input of the switch 106 of the drive of the line forming mechanism 7. An output 131 of the computer unit 104 is coupled to the motor 13 (FIG. 1) of the type size changing mechanism 6, which rotates the turret 10 with the lenses 11. The motor 13 is also electrically associated with the control input of the switch 106 via the computer unit 104.

The electrographic photocomposing machine of the present invention operates in the following manner.

Following instructions from the computer unit 104 through the switch 111 (FIG. 5) the intermediate image carrier 9 (FIG. 2) moves line by line in the direction indicated by arrow C, driven by the step motor 38. When the coronizing wires and grid of the charging device 42 are energized, a charge is deposited on the surface of the photoconductive layer of the intermediate image carrier 9. Each text line is formed on the intermediate image carrier 9 during a pause the latter makes as the carriage 27 (FIG. 1) of the line forming mechanism 7, driven by the step motor 30, moves along its generatrix. When the flashtube 2 comes on, the carriage 27 projects the selected character from the film 89 (FIG. 4) of the type carrier 1 on a preset coordinate of the line through the prism 4 (FIG. 1), the lenses 11, 28 and the mirror 29.

The surface of the charged photoconductive layer of the intermediate image carrier 9 being exposed to characters provides for recombination of the charge on the illuminated portions of the layer, whereby a latent image is produced thereon in the form of a potential relief.

The required character on the type carrier 1 is selected by the computer unit 104 (FIG. 5) following instructions from the data input unit, which stops the carriage 27 (FIG. 1) via the switch 106 (FIG. 5) with the aid of the step motor 30 after the carriage 27 (FIG. 1) has reached the preset line coordinate, and which switches off the flashtube 2 via the control unit 109 (FIG. 5). After each text line is completed, the carriage 27 (FIG. 1) returns to the initial position.

To change the type face in the text, the computer unit 104 (FIG. 5) switches on the motor 98 (FIG. 4) of the type face changing mechanism 90 as soon as the carriage 27 (FIG. 1) reaches the required line coordinate, and the motor 98 (FIG. 8) turns the cam 91 with the aid of the Maltese cross mechanism through a predetermined angle. The cam 91 shifts the drum 83 with the film 89 in an axial direction through the roller 92, thereby placing the row with the desired type face onto the optical axis of the photographic unit 5 (FIG. 1).

To change the type size in the text, the computer unit 104 (FIG. 5) first activates the electromagnet 19 (FIG. 1), as soon as the carriage 27 reaches the required line coordinate, which releases the turret 10 from its fixed position with the aid of the arm 16 and the roller 17, then the motor 13 of the type size changing mechanism 6 is switched on and turns the turret 10 through a predetermined angle with the aid of the belt drive 15, thereby placing a respective lens 11 on to the optical axis of the photographic unit 5. After the lens 11 has reached the operating position, the electromagnet 19 is de-energized and the arm 16 with the roller 17 lock the turret 10 in position. The changing of the lens 11 provides for a change of the type size on the intermediate image carrier 9 by changing the scale of photographing the characters from the film 89 (FIG. 4) of the type carrier 1, having the same basic type size thereon.

The Galilean tube 20 which, for example, doubles the scale is intended to extend the range of type sizes reproduced by the machine. If, for example, without the Galilean tube 20 the five lenses 11 enable reproduction of type sizes of 5, 6, 7, 8 and 10, points, with the Galilean tube 20 the same lenses 11 provide for type sizes of 10, 12, 14, 16 and 20 points.

In the photographic unit 5 (FIG. 1), the Galilean tube 20 is located in the rocking arm 22 actuated by the electromagnets 23 and, for reproduction of small type sizes, it is in a position remote from the optical axis of the photographic unit 5. To reproduce large type sizes, the computer unit 104 (FIG. 5) switches on the motor 13 (FIG. 1) and, at the same time, activates one of the electromagnets 23 and places the Galilean tube 20 on to the optical axis of the photographic unit 5.

The herein-described embodiment of the type carrier 1 with the type face changing mechanism 90, of the photographic unit 5 with the type size changing mechanism 6 and of the line forming mechanism 7 ensures precise placing of characters in a line both in simple and complex settings (involving different type faces and sizes) owing to the fact that, after the carriage 27 (FIG. 1) has reached the required line coordinate, it waits till the next character is to be exposed. The carriage 27 can be made extremely light and each of its stops will not involve considerable forces of inertia to be defeated. As can be inferred from experimental data, the average composition speed in the proposed line forming mechanism 7 may be as high as 60 characters per second.

Depending on the type of the film 79 (FIG. 4) of the type carrier 1, the machine may handle from 250 to 1,000 characters in a single composing procedure, which amounts to 2 to 8 sets of types of different faces for Russian and main European languages (English, German, French, Italian, etc.)

The use of two basic type sizes of 6 and 12 points on the type carrier 1 permits reproduction of type sizes in the range of 5 to 48 points, and hence, composition of solid texts and most of headline setting. If necessary, the machine may incorporate an additional type carrier with interchangeable characters for composition of mathematical and chemical formulas, as well as job composition, in which case the prism 4 (FIG. 1) is made rotatable about the vertical axis.

Figure 2:
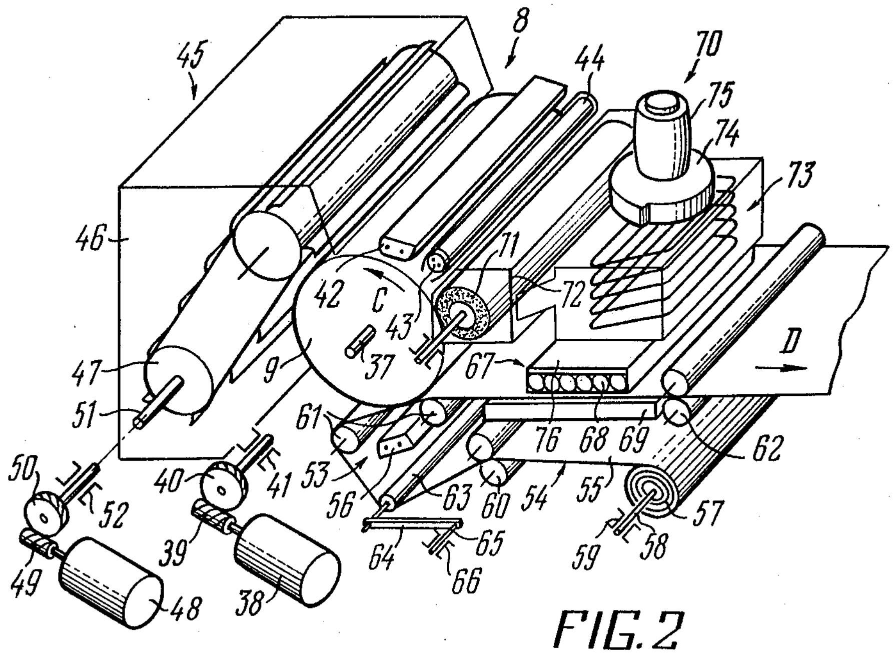
FIG. 2 is an axonometric view of the electrophotographic section of the machine, according to the invention.

The latent image of the text, obtained on the surface of the intermediate image carrier 9 as it moves on line by line is developed in the latent image developing device 45 (FIG. 2). The development takes place in the surface of the photoconductive layer being powdered with a developer which is a mixture of an electrographic toner and a support, stored in the housing 46, with the aid of the elevator 47 driven by the motor 48. As the developer is being exhausted, it is replenished with the toner by means of the toner dispenser.

The developed powder image of the text is delivered by further movement intermediate image carrier 9 into the powder image transferring device 53 in which the image is transferred to the paper web 55 under the effect of the electrostatic forces occurring in the powder as a result of the surface of the paper web 55 being given a charge in the charging device 56.

The paper web 55 is fed toward the intermediate image carrier 9 from the roll 57 with the aid of the carrier rollers 60 provided with a drive. The finished prints are withdrawn by means of the discharge rollers 62 also having a drive with a friction clutch ensuring optimum tension of the paper web 55 without the latter's slipping through the powder image transfer zone and with reliable separation of the finished prints from the intermediate image carrier 9. In order to prevent jerks from being transmitted from the intermediate image carrier 9 to the roll 57, the paper web 55 forms, before entering the image transfer zone in which mechanical contact between the web 55 and the photoconductive layer is provided, a loop with the aid of the light tension roller 63. Being provided with its own control unit, the roller 63 controls the drive of the carrier roller 60 and maintains the required loop size.

The paper web 55 with the transferred powder image is fed by the discharge rollers 62 into the unit 67 for fixing the powder image on the paper, in which it makes contact with the heated plate 77 (FIG. 3) and is heated to a temperature close to the melting point of the powder. After the paper web 55 has covered a distance equal to or slightly less than the length of the powder image fusion zone (equal to the dimension of the reflector 76 in the direction of motion of the paper web 55), which corresponds to a predetermined number of pulses actuating the step motor 38 (FIGS. 2 and 5) that drives the intermediate image carrier 9 and being added up by the cyclic pulse counter 115 (FIG. 5), the latter activates, via the switch 116, the heaters 68 and the motor 82 of the fan 81 (FIG. 3) for a predetermined period of time during which the powder fuses and the image is fixed on the paper web 55. Then, the pulse counter 115 (FIG. 5) is automatically reset and starts a new cycle.

After a pulse has been applied from the output of the pulse counter 115 to the input of the timer 119, the latter is activated for a predetermined period of time. At the same time, the timer 119 produces a pulse at the output 118, starting the motor 82 of the fan 81 which cools the powder image, while the output 121 produces a pulse corresponding to the firing voltage, applied to the collector of the transistor 122 and to the control gate of the thyristor 120. The latter turns on and activates the heaters 68 only when the pulsating voltage they receive from the output 129 of the full-wave rectifier 127 approaches zero, which corresponds to the transistor 122 being turned off. After the timer 119 is off, the motor 82 is de-energized and the heaters 68 are switched off at the instant when the voltage thereacross equals zero, for the thyristor 120 turns off when the voltage across its control gate is zero.

The final step of the machine's operation is cleaning of the intermediate image carrier 9 (FIG. 2) by the revolving friezed roller 71 from which the toner is removed through the filter 73 by the fan 74. Then, the intermediate image carrier 9 is illuminated by the lamp 43, whereby the photoconductor returns to the initial state (no charges on its surface). The photoconductive layer is thus ready for the next image.

Experimental data indicate that the preheating of the paper web 55 in combination with air cooling of the powder image with the heaters 68 being on prevents the burn-through of the paper (the image contours appearing on its back side) owing to the heat from the heated powder being transferred primarily to the surrounding atmosphere rather than to the paper. The unit 114 for pulsed actuation of the heaters 68 protects the electronic components of the machine against RF noise by virtue of the heaters 68 being switched on and off only when the voltage thereacross is close to zero.

The above design features of the unit 67 fixing the powder image on the paper ensure uniform quality fixing of the powder image on the paper web 55 no matter how irregularly it may move.

Thus, the proposed electrographic photocomposing machine can produce both simple and complex text settings of superior quality.

What is claimed is:

1. An electrographic photocomposing machine comprising:

a rotary type carrier;

a flashtube of said rotary type carrier, having a control unit;

a photographic unit arranged downstream of said type carrier along the beam from said flashtube;

a line forming mechanism arranged downstream of said photographic unit along the beam from said flashtube;

a drive of said line forming mechanism, which is essentially a start-stop mechanism;

an electric pulse generator of said drive of said line forming mechanism;

a switch of said drive of said line forming mechanism, having an input, a control input and an output, said input being connected to said electric pulse generator of said drive of said line forming mechanism;

an electrophotographic section arranged downstream of said line forming mechanism along the beam from said flashtube;

a cylindrical intermediate image carrier of said electrophotographic section, optically associated with said line forming mechanism;

a drive of said intermediate image carrier, which is essentially a start-stop mechanism;

an electric pulse generator of said drive of said intermediate image carrier;

a switch of said drive of said intermediate image carrier, having an input, a control input and an output, said input being connected to said electric pulse generator of said drive of said intermediate image carrier;

a step motor of said drive of said intermediate image carrier, connected in series with said output of said switch of said drive of said intermediate image carrier;

a computer unit having a first, second, third, fourth and fifth outputs, said first output of said computer unit being connected to said control input of said switch of said drive of said line forming mechanism, said second output being connected to said control unit of said flashtube, and said third output being connected to said control input of said switch of said drive of said intermediate image carrier;

a charging device of said electrophotographic section, arranged in direct proximity to said intermediate image carrier, in the latnet image forming zone, and having a lamp for exposure of said intermediate image carrier;

a latent image developing device of said electrophotographic section, contiguous to the surface of said intermediate image carrier and arranged in the direction of its rotation downstream of said charging device;

a powder image transferring device of said electrophotographic section, provided with a paper feed system having a paper web and a drive, said powder image transferring device ensuring mechanical contact between said paper web and said intermediate image carrier and being arranged downstream of said intermediate image carrier in the direction of its rotation, said paper web having a first side onto which the powder image is transferred and a second side opposite to the first;

heaters of said electrophotographic section, arranged near said paper web at its first side, downstream of said powder image transferring device in the direction of motion of said paper web, and having a neutral wire;

a self-contained means for contact heating of said paper web of said electrophotographic section, arranged at the second side of said paper web opposite said heaters;

a means for air coolong of the powder image of said electrophotographic section, arranged opposite said heaters level with said paper web;

a unit for pulsed actuation of said heaters of said electrophotographic section, having an input, a first and second outputs, said first output of said unit being connected to said heaters and said second output being connected to said means for air cooling of the powder image;

a cyclic counter of pulses of said drive of said intermediate image carrier of said unit for pulsed actuation of said heaters, having an input which serves as the input of said unit for pulsed actuation of said heaters and an output;

a switch of said unit for pulsed actuation of said heaters, having an input, a first and second outputs, said input of said switch being connected to said output of said cyclic pulse counter, said first and second outputs of said switch serving as the first and second outputs, respectively, of said unit for pulsed actuation of said heaters;

a unit for fixing the powder image on the paper of said electrophotographic section, comprising said heaters, said self-contained means for contact heating of said paper web, said means for air cooling of the powder image, and said unit for pulsed actuation of said heaters;

a device for cleaning of said intermediate image carrier of said electrophotographic section, arranged downstream of said powder image transferring device in the direction of rotation of said intermediate image carrier.

2. An electrographic photocomposing machine as claimed in claim 1, wherein said rotary type carrier is provided with a type face changing mechanism with a drive, connected to said fourth output of said computer unit and electrically associated via said computer unit with said control input of said drive of said line forming mechanism.

3. An electrographic photocomposing machine as claimed in claim 1, wherein said photographic unit is provided with a type size changing mechanism with a drive, connected to said fifth output of said computer unit and electrically associated via said computer unit with said control input of said drive of said line forming mechanism.

4. An electrographic photocomposing machine as claimed in claim 1, comprising:

a timer of said switch of said unit for pulsed actuation of said heaters, having an input which serves as the input of said switch and is connected to said output of said cyclic pulse counter, a first and second outputs, said second output of said timer serving as the first output of said switch;

a thyristor of said switch of said unit for pulsed actuation of said heaters, having an anode, a cathode and a control gate, said control gate of said thyristor being connected to said first output of said timer, while said cathode of said thyristor is connected in series with said heaters and serves as said second output of said switch;

a transistor of said switch of said unit for pulsed actuation of said heaters, having a collector, an emitter and a base, said collector of said transistor being connected to said first output of said timer and to said control gate of said thyristor, while said emitter of said transistor is connected to said neutral wire of said heaters;

a voltage divider of said switch of said unit for pulsed actuation of said heaters, having a first and second resistors connected in series and a mid-point between said resistors and being connected between said anode of said thyristor and said neutral wire of said heaters, said mid-point between said first and second resistors being connected to said base of said transistor;

a full-wave rectifier of said switch of said unit for pulsed actuation of said heaters, having a first and second outputs, said first output of said full-wave rectifier being connected to said anode of said thyristor and said second output of said full-wave rectifier being connected to said neutral wire of said heaters.

* * * * *